United States Patent [19]

Katz

[11] Patent Number: 5,286,000
[45] Date of Patent: Feb. 15, 1994

[54] WAND ACTIVATED DISPENSING VALVE FOR A FAUCET

[76] Inventor: Gavriel Katz, 5025 S. Eastern Ave., No. 197, Las Vegas, Nev. 89119

[21] Appl. No.: 81,231

[22] Filed: Jun. 25, 1993

[51] Int. Cl.⁵ .................. F16K 35/00; E03B 3/18
[52] U.S. Cl. .................. 251/339; 251/100; 137/550; 137/603
[58] Field of Search ............... 137/550, 603; 251/100, 251/339

[56] References Cited

U.S. PATENT DOCUMENTS

| | | | |
|---|---|---|---|
| 1,888,130 | 11/1932 | Huffman | 251/100 |
| 2,785,881 | 3/1957 | Dolan | 251/339 |
| 4,512,551 | 4/1985 | Dalferth | 251/339 |
| 4,940,206 | 11/1990 | Sheen | 251/339 |
| 5,065,700 | 11/1991 | Cross | 251/339 |

*Primary Examiner*—A. Michael Chambers
*Attorney, Agent, or Firm*—Plante, Strauss and Vanderburgh

[57] ABSTRACT

There is disclosed a wand activated dispensing valve that can be installed on the spouts of water faucets. The valve includes a housing having an internal cup-shaped member with the bottom wall of the cup-shaped member being foraminous and having a substantial thickness. The bottom wall preferably has a plurality of circumferentially disposed radial slots in an outer annular area, surrounding a central wand aperture which receives a rod-like wand. Preferably the wand aperture is surrounded by an internal recess in the bottom wall of the cup-shaped member which receives the bulbous upper end of the wand, capturing the wand in the assembly. The lower end of the valve member rides on the bulbous upper end of the wand and the valve member is lifted when the wand is tilted to one side. The housing includes a valve plate having a central port which receives the valve member, the upper end of which seats against a valve seat carried by the valve plate. The housing has conventional threads at is upper end to permit attachment to the spout of substantially all water faucets.

15 Claims, 2 Drawing Sheets

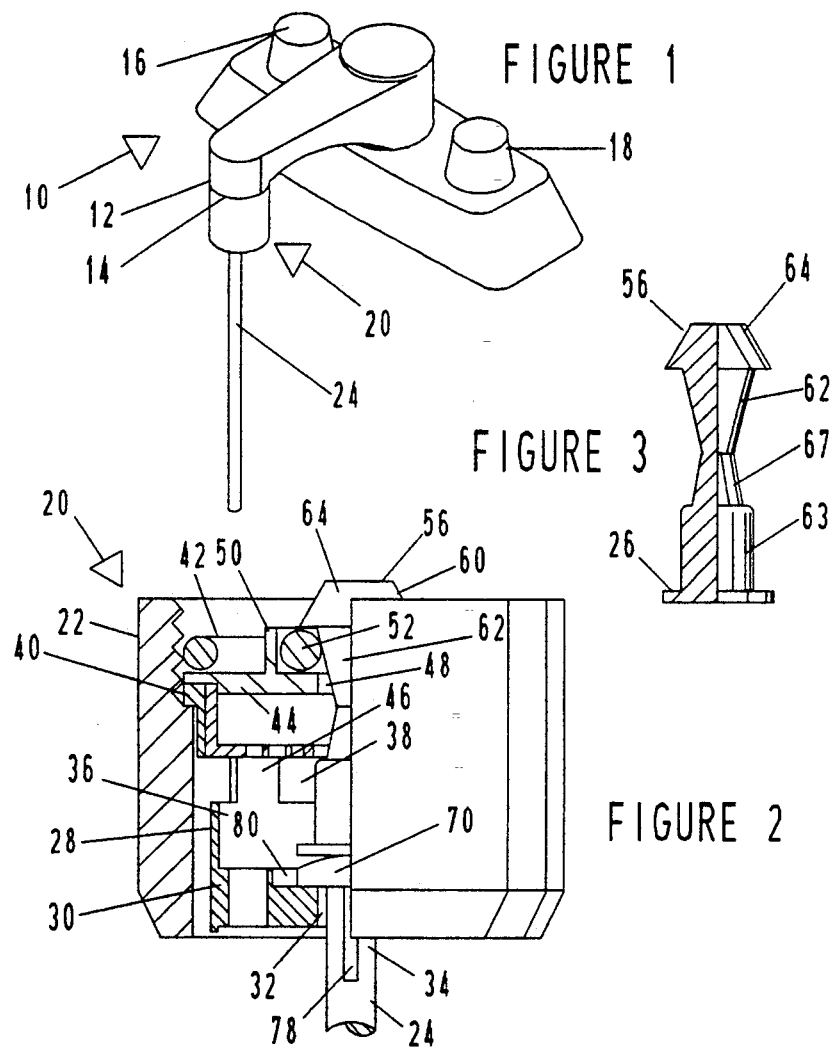

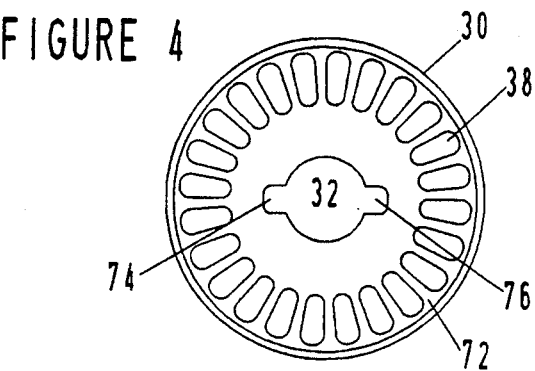
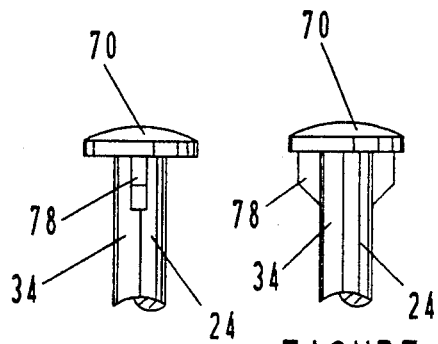
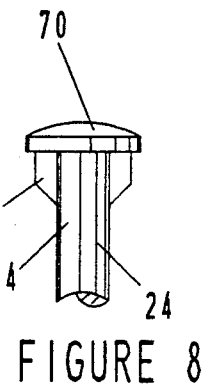
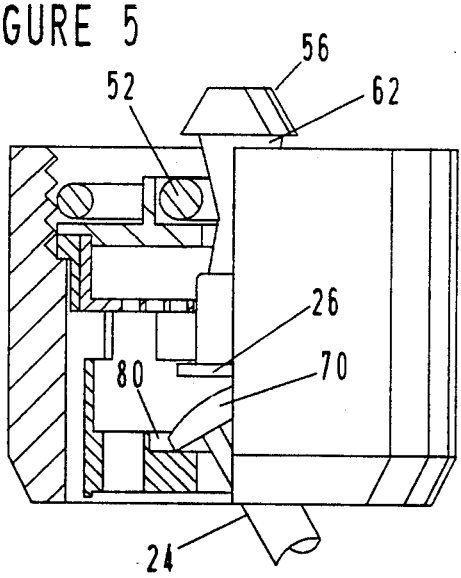
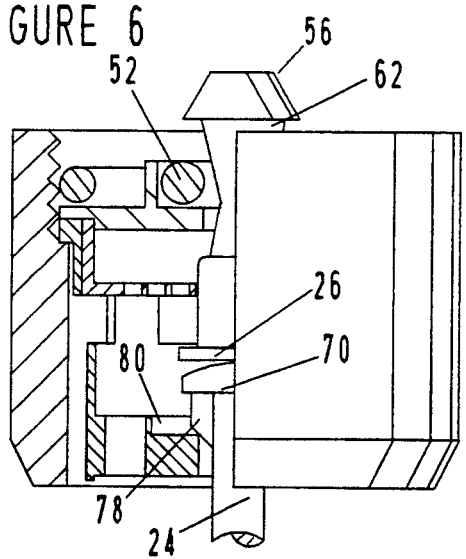

WAND ACTIVATED DISPENSING VALVE FOR A FAUCET

BACKGROUND OF THE INVENTION

1. Field of the Invention

This invention relates to a dispensing valve for a water faucet, and in particular, to a wand activated valve.

2. Brief Statement of the Prior Art

The conventional water faucet for wash basins, sinks and the like, in household and commercial use, has a single central faucet with hot and cold manual valves. Attempts to avoid the use of the manual valves have included electronic devices with proximity sensors which turn the water on when a person's hands are placed beneath the faucet. Also some commercial rest rooms provide foot activated valves, etc.

A recent improvement of mine, which is described in application 98001 filed on Apr. 29, 1991, in Israel, is a wand actuated valve which fits on the end of the faucet and which has an internal valve member with a dependent wand which lifts the valve member from its seat when the wand is displaced side-to-side. In this application, the manual valves are left open and the dispensing of water from the spout is controlled by the wand activated valve. The wand hangs downwardly from the lower end of the dispensing valve so that it can be readily swung to one side when water is desired.

The aforementioned dispensing valve is very simple in construction and can be readily installed on substantially all household and commercial faucets, as it fits into the threaded ends of the faucet spouts replacing aerators which are commonly used on the faucets. The wand activated dispensing valve is an ideal aid for handicapped persons. Additionally, it conserves water as the valve automatically closes when the wand is permitted to return to its vertical, undeflected, position.

OBJECTIVES OF THE INVENTION

It is an objective of this invention to provide a wand activated dispensing valve for attachment to the spout of a water faucet.

It is a further object of this invention to provide the wand activating dispensing valve which will dispense a smooth column of water when activated.

It is an additional object of this invention to provide a wand activated dispensing valve which will provide for full discharge of water from a faucet.

It is a still further object of this invention to provide a wand activated dispensing valve which resists clogging from sedimentation during use.

Other and related objectives will be apparent from the following description of the invention.

BRIEF DESCRIPTION OF THE INVENTION

This invention comprises a wand activated dispensing valve that can be installed on the spouts of water faucets. The valve includes a housing having an internal cup-shaped member with the bottom wall of the cup-shaped member being foraminous and having a substantial thickness. The bottom wall preferably has a plurality of circumferentially disposed radial slots in an outer annular area, surrounding a central wand aperture which receives a rod-like wand. Preferably the wand aperture is surrounded by an internal recess in the bottom wall of the cup-shaped member which receives the bulbous upper end of the wand, capturing the wand in the assembly. The lower end of the valve member rides on the bulbous upper end of the wand and the valve member is lifted when the wand is tilted to one side. The housing includes a valve plate having a central port which receives the valve member, the upper end of which seats against a valve seat carried by the valve plate. The housing has conventional threads at is upper end to permit attachment to the spout of substantially all water faucets.

BRIEF DESCRIPTION OF THE FIGURES

The invention will be described with reference to the figures of which:

FIG. 1 is a perspective view of a typical water faucet fitted with the dispensing value of the invention;

FIG. 2 is an elevational sectional view of the wand activated dispensing valve of the invention;

FIG. 3 is an elevational view, partly in section, of the valve member of the valve of the invention;

FIG. 4 is a plan view of the undersurface of the dispensing valve;

FIG. 5 illustrates the faucet in an open position;

FIG. 6 illustrates the dispensing valve in the detented open position; and

FIGS. 7 and 8 illustrate the upper end of the wand of the dispensing valve of the invention.

DESCRIPTION OF PREFERRED EMBODIMENTS

Referring to FIG. 1, there is illustrated a conventional faucet set 10 used for dispensing hot and cold water. The set includes a spout 12 having an internally threaded open discharge end 14. Hot and cold manually controlled valves 16 and 18 are provided. The spout 12 of the faucet is fitted with the wand activated dispensing valve 20 of the invention. The valve housing 22 has a threaded end which is fitted onto the threaded end of the faucet spout 12 and has a wand 24 that is downwardly suspended from the lower end of the valve housing 22 along the path of the water discharged from the valve.

Referring now to FIG. 2, the invention is illustrated in greater detail. As there illustrated, the housing 22 receives a cup-shaped member 28 having a lower foraminous plate 30 which has a central through aperture 32 which receives the upper end 34 of the wand 24. The aperture 32 is in a central recess 80 in the plate 30.

The cup-shaped member 28 has a right cylindrical wall 36 which has a plurality of circumferential elongated slots 38. The upper end of the cup has a peripheral edge 40 which supports the cup within the housing 22.

A subassembly 42 of the valve plate 44 in and a subjacent filter disk 46. The valve plate 42 is a metallic circular plate having a central aperture 48 with a circular rim 50 surrounding aperture 48, forming a valve seat recess in which is received the valve seat in the form of a resilient O-ring 52. The filter disk 46 is a foraminous plate, molded of plastic, having a plurality of small diameter foramen 54.

The valve member 56 shown in detail in FIG. 3 is an elongated pin having, at its upper end, the valve closure 60 in the form of a tapered shank 62 and a larger diameter head 64. The tapered shank 62 seats against the resilient O-ring 52 under the line pressure of the water supply, which forces the valve member 56 downwardly against the O-ring 52. The base 63 is cylindrical to fit within the through base 65 (see FIG. 2) of the filter disc 46 and has an integral circular flange 26 which retains the valve member in the assembly. The neck 67 between the base and shank 67 can be tapered as shown.

A large diameter O-ring 66 is received over the peripheral edge 68 of the valve plate 42 and, if necessary, a threaded adapter can be provided to adapt the internal threaded housing to external threads on its upper neck thereby providing an assembly which can be used with internally and externally threaded faucet spouts.

The wand 24 is an elongated slender rod having a bulbous upper end 70. The wand 24 should have sufficient length to hang downwardly into the sink or basin so that it can be readily tilted by the user.

Referring now to FIG. 4, the bottom foraminous plate 30 is illustrated in plan view. As there illustrated, plate 30 has a plurality of elongated slots 38 which are arranged in a circular pattern occupying the outer annular area 72 of the plate 30. The slots 38 have a length to width from 2 to about 3 and, preferably, are formed with rounded ends. In a typical application for a standard faucet spout having an internal diameter of one inch the slots have a length of 7 mm. and a width of 3 mm.

Centrally disposed in the lower foraminous plate is the wand aperture 32. Preferably the wand aperture 32 is non-circular, having a pair of slots 74 and 76 which are disposed at 180° angular spacing, thereby forming a keyway which intersects the central aperture 32. The wand (see FIG. 2) has a matching key for the keyway in the form of axial ribs 78 which are located immediately beneath the bulbous upper end 70 of the wand 24.

As shown in FIG. 5, when the wand 24 is tilted to one side, the bulbous upper end 70 of the wand pivots in recess 80 and pushes upwardly against the lower end 26 of the valve member 56 which is located in a resting position immediately on the top surface of the bulbous upper end 70 of the wand. This forces the valve member 56 upwardly, lifting the closure member 60 off the O-ring valve seat, opening the valve.

In most applications there is a need for detenting the valve in an open position. For this purpose, the upper end 82 of the wand has a pair of axial ribs 78; see FIGS. 7 and 8. The ribs 78 can be pushed through the keyway slots 74 and 76 (see FIG. 4) in the bottom foraminous plate 30 when the axial ribs 78 are aligned with the slots 74 and 76. After the ribs 78 have cleared the plate 30 and entered the housing, the wand member 24 can be rotated to move the axial ribs 78 out of alignment with slots 74 and 76, thereby detenting the upper end 34 of the wand 24 in the housing 22 in its elevated position, retaining the valve in an open condition. The detenting position is shown in FIG. 6.

The invention provides for a very smooth discharge of water in aa aerated column with little or no splashing or diversion of the water from the column. The valve also functions as an aerator thus minimizing splashing of discharged water. The valve is ideally suited for home applications, particularly for handicapped persons who have difficulty manipulating the hand knobs of a conventional faucet set. Further, the invention conserves water as the water is only discharged when the wand is moved by the user, thereby avoiding the continuous discharge of water commonly experienced with manual control valves. The wand control valve is also ideally suitable for hospital applications for washing hands of medical personnel as it eliminates the need to turn manual valves on, and thus risk contamination of washed hands. The valve structure of this invention having the relatively thick lower foraminous plate and the preferred circular array of swats results in the discharge of a aerated column of water which is much smoother and more coherent than achieved by other structures. Additionally, the enlarged bulbous upper head of the wand permits the opening of the valve to a full open position, permitting more rapid filling of the washbasin or sink.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A dispensing faucet valve which comprises:
   a. a valve housing formed of a open ended sleeve surrounding a through lumen;
   b. a first foraminous plate having a first plate thickness and located within said sleeve at an intermediate axial position and extending across the lumen of said sleeve;
   c. a second foraminous plate located at the lower end of said sleeve and extending across the lower open end thereof, said second foraminous plate having a through, wand aperture and a second plate thickness greater than three millimeters and at least 1.5 times greater than said first plate thickness;
   d. a valve plate located above said first foraminous plate and a valve port surrounded by a valve seat;
   e. a valve member received in said valve port and axially moveable therein, having a closure member at its upper end, and extending through said valve port with its lower end adjacent said wand aperture;
   f. a wand having a bulbous upper end and a slender elongated shaft received within said wand aperture and captured within housing with said bulbous upper end contacting said lower end of said valve member, whereby upon deflection of said wand, said bulbous upper end moves said valve member to lift said closure member off said valve seat.

2. The dispensing faucet valve of claim 1 wherein the foramens of said second foraminous plate are elongated radial slots disposed in a circular pattern about an outer annular area of said second foraminous plate.

3. The dispensing faucet valve of claim 2 wherein said radial slots of said second foraminous plate have a slot length from 0.15 to 0.20 percent of the diameter of said lumen.

4. The dispensing faucet valve of claim 3 wherein said radial slots have a length from 2 to 3 times their width.

5. The dispensing faucet valve of claim 1 wherein the foramina of said first foraminous plate are small diameter apertures to provide a filter screen.

6. The dispensing faucet valve of claim 1 including a recess in the upper surface of said second foraminous plate which surrounds said wand aperture to provide a seat for said bulbous upper end of said wand.

7. The dispensing faucet valve of claim 6 wherein the wand aperture of said second foraminous plate is non-circular and said wand has a corresponding non-circular section immediately beneath said bulbous upper end, whereby said wand can be lifted into said housing, opening said valve, and rotated with said non-circular section functioning as a detent to retain said wand in said lifted position.

8. The dispensing faucet valve of claim 7 wherein said non-circular section is formed by a pair of axial ribs located at 180 degree angular spacing on the outer surface of said wand.

9. The dispensing faucet valve of claim 8 wherein said second foraminous plate has an integral cylindrical wall, forming a cup which is received within said lumen.

10. The dispensing faucet valve of claim 9 including a plurality of through apertures in said cylindrical wall of said cup.

11. The dispensing faucet valve of claim 10 wherein said through apertures are circumferentially aligned slots in said cylindrical wall of said cup.

12. The dispensing faucet valve of claim 9 wherein said sleeve is metallic and said cup and said first foraminous plate are molded of plastic.

13. The dispensing faucet valve of claim 1 wherein said valve plate is metallic.

14. The dispensing faucet valve of claim 13 wherein said valve plate has an upstanding circular rim surrounding said valve port and said valve seat is received within said circular rim.

15. The dispensing faucet valve of claim 14 wherein said valve seat is an O-ring.

* * * * *